United States Patent [19]

Neville et al.

[11] Patent Number: 4,999,917
[45] Date of Patent: Mar. 19, 1991

[54] CHAIN SAW EXTENSION STRUCTURE

[76] Inventors: Richard A. Neville, Box 153; Richard H. King, Sr., P.O. Box 226, both of Kingman, Kans. 67068

[21] Appl. No.: 543,084

[22] Filed: Jun. 25, 1990

[51] Int. Cl.⁵ .......................................... B27B 17/02
[52] U.S. Cl. ...................................... 30/383; 30/296.1
[58] Field of Search ............... 30/383, 166.3, 296.1, 30/122, 387, 382

[56] References Cited

U.S. PATENT DOCUMENTS

| | | | |
|---|---|---|---|
| 4,341,017 | 7/1982 | Janczak | 30/381 |
| 4,520,563 | 6/1985 | Marceau | 30/122 |
| 4,884,340 | 12/1989 | Newman | 30/122 |
| 4,916,818 | 4/1990 | Panek | 30/383 |

Primary Examiner—Hien H. Phan
Assistant Examiner—John M. Husar
Attorney, Agent, or Firm—John Wade Carpenter

[57] ABSTRACT

A drive transmitting extension structure and a chain saw having the drive transmitting extension structure. The chain saw also has a drive motor and a cutting head, both engaged to the drive transmitting extension structure. The drive transmitting extension structure has a first receiver member for being removably connected to the drive motor; a second receiver member for being removably secured to the cutting head; and an upper tube and a lower tube which are connected to the first and second receiver member. A drive chain is engaged to the drive motor and to the cutting head and passes through the upper tube and the lower tube. A first and second spacer member are connected to the upper and lower tubes. A first and second bolt engages adjustably the first and second spacer members respectively for holding the upper and lower tubes in the first and second receiver members.

16 Claims, 7 Drawing Sheets

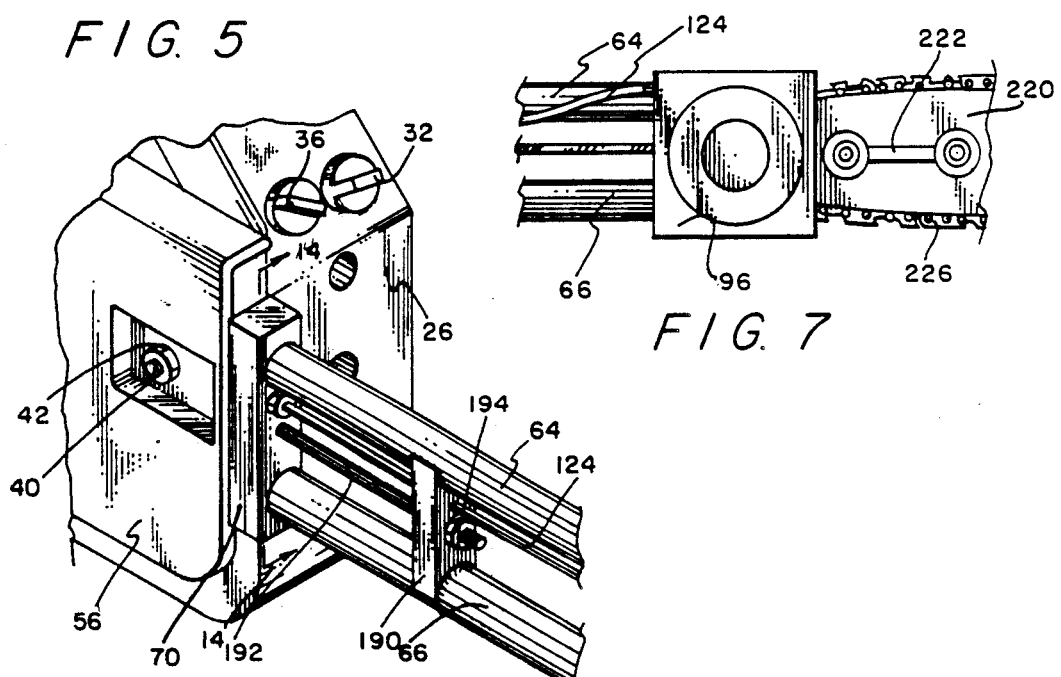
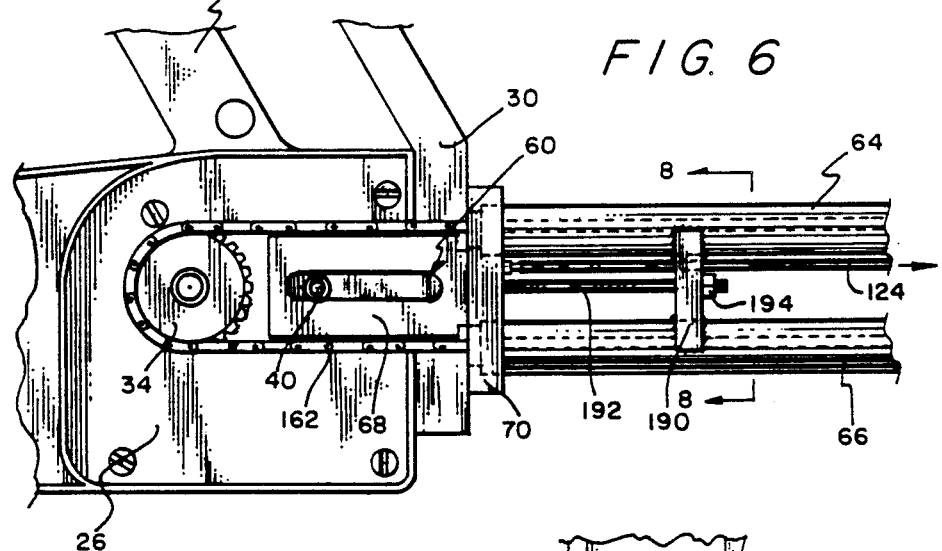
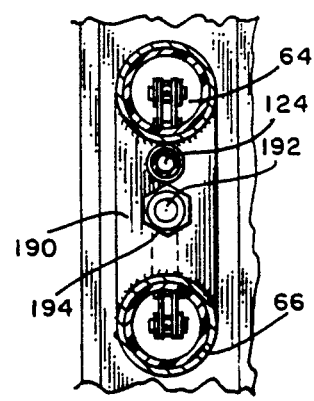

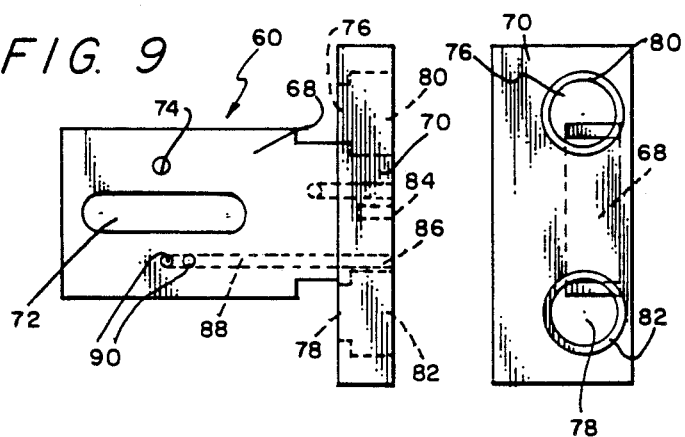
FIG. 9
FIG. 10
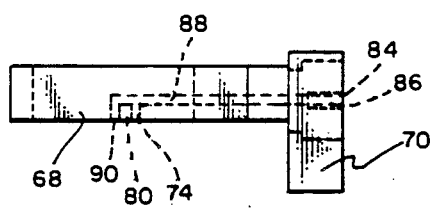
FIG. 11
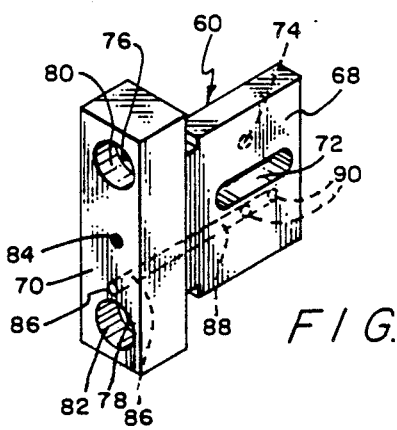
FIG. 12
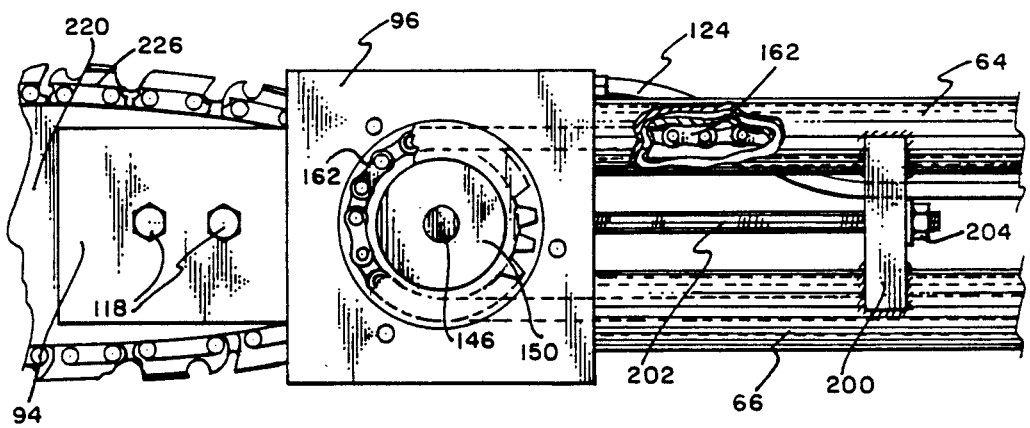
FIG. 13

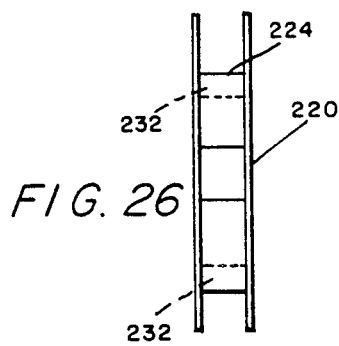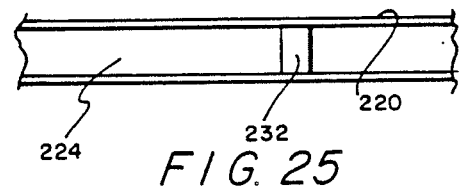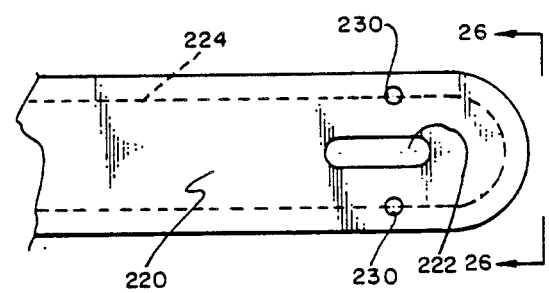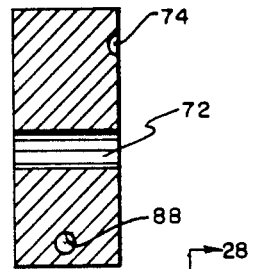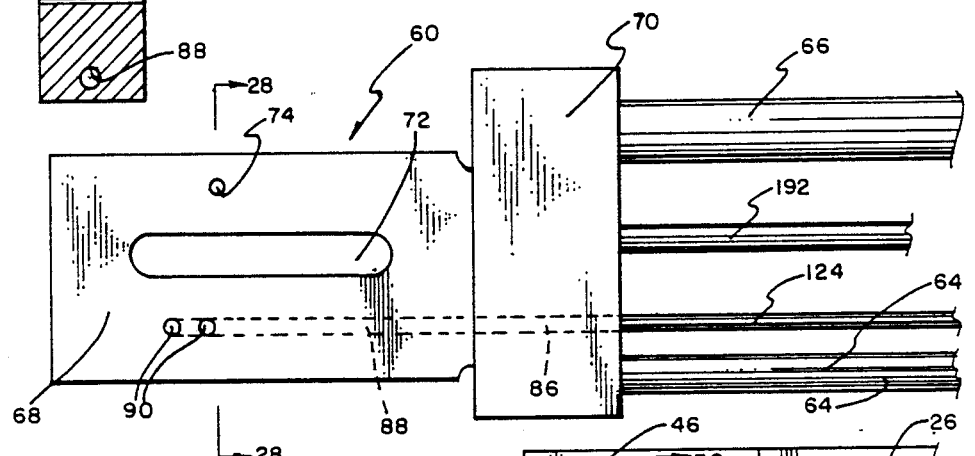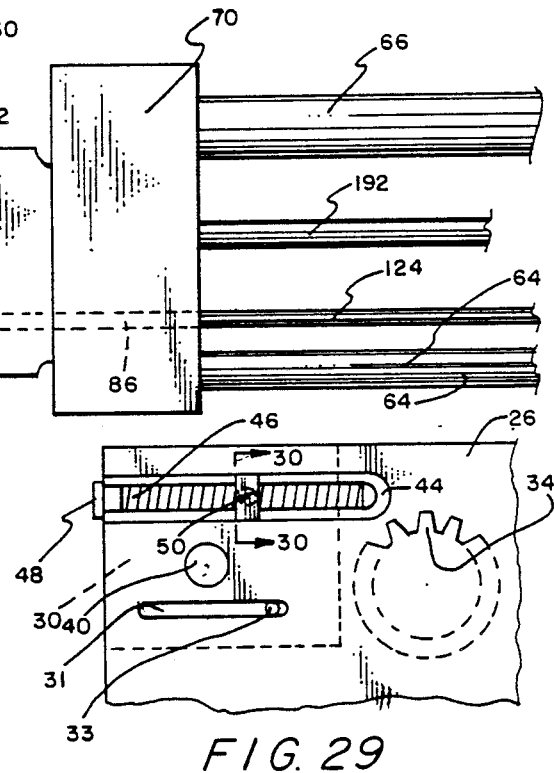

4,999,917

CHAIN SAW EXTENSION STRUCTURE

FIELD OF THE INVENTION

This invention is related to a chain saw for trimming foliage, sawing logs, cutting trees, and similar operations. More particularly, this invention provides a structure for extending the reach of chain saws by positioning the cutting head distantly from the motor component.

DESCRIPTION OF THE PRIOR ART

The conventional chain saw, such as that disclosed in U.S. Pat. No. 2,925,105 to Hayden, has a cutting head which extends outward from a motor and handle assembly typically for a distance of about one or two feet. Frequently the operator may be unable to stand immediately adjacent tree limbs or the like which are to be cut because of the elevation of the limbs, intervening foliage or for other reasons. The operator's arms at best can add another two or three feet to the effective reach of the saw but holding the somewhat heavy appliance with raised and/or extended arms increases muscular strain and can be very tiring.

In many work situations, the material which is to be cut simply cannot be reached with the conventional chain saw by an operator standing on the ground. Climbing a tree or the like with an operative chain saw can be hazardous at least under some conditions. To avoid that problem, the operator must ascend a ladder, scaffolding or the like. This complicates the operation at best and may not always enable the operator to assume a comfortable untiring position. The best elevated supports for such operations, so called cherry pickers, are very costly and may not as a practical matter be available to many chain saw users.

Extensions, such as that disclosed in U.S. Pat. Nos. 1,579,783 to Ross, 4,574,481 to Ericsson, 4,654,971 to Fettes et al, 4,757,613 to Baudreau et al, and 4,760,646 to Siegler, have heretofore been devised for the purpose of extending the effective reach of a chain saw in order to minimize problems and complications of the above discussed kind. As heretofore constructed, such devices do not resolve the problems to the most desirable extent. The previously mentioned U.S. patents are all incorporated herein by reference thereto.

Some prior chain saw extenders are basically simply a pole which is attached to the chain saw body to enable the saw as a whole to be held several feet outward from the operator's body. This results in a cantilevering of the entire weight of the saw which greatly increases the muscular effort demanded of the operator.

The apparatus of the present invention is directed to overcoming all or more of the problems discussed above.

SUMMARY OF THE INVENTION

The present invention accomplishes its desired objects by broadly providing a chain saw extension structure for a chain saw that has a drive motor and a cutting head removably connected to the extension structure. The extension structure comprises a first receiver member for being removably connected to the drive motor. The first receiver member has a first body and a first shoulder bound to the first body. The first body has a structure defining a first oil body bore wherethrough oil passes from the drive motor. The first shoulder has a structure defining a first upper opening, a first upper recess communicating with the first upper opening, and a first lower opening, a first lower recess communicating with the first lower opening, and a first oil shoulder bore communicating with the first oil body bore for receiving oil from the first oil body bore and passing the same into an oil conduit line. A second receiver member is provided for being removably secured to the cutting head. The second receiver member has a second body and a second shoulder bound to the second body. The second shoulder has a structure defining a second upper opening, a second upper recess communicating with the second upper opening and a second lower opening, a second lower recess communicating with the second lower opening and a second oil shoulder bore for receiving oil from an oil conduit line. The second body has a structure defining a second oil body bore communicating with the second oil shoulder bore for receiving oil therefrom and for passing the same into contact with the cutting head. The extension structure also has an oil conduit line connected to the first shoulder and to the second shoulder and communicating with said first oil shoulder bore and with said second oil shoulder bore. An upper tube is disposed in the first upper recess of the first shoulder and in the second upper recess of the second shoulder; and a lower tube is disposed in the first lower recess of the first shoulder and in the second lower recess of the second shoulder. An endless chain is engaged to the drive motor and passes through the first upper opening, the upper tube and the second upper opening, and through the first lower opening, the lower tube and through the second lower opening.

It is therefore an object of the present invention to provide a chain saw.

It is another object of the present invention to provide a drive transmitting extension structure for a chain saw.

These, together with the various ancillary objects and features which will become apparent to those skilled in the art as the following description proceeds, are attained by this novel chain saw and extension structure therefor, a preferred embodiment being shown with reference to the accompanying drawings, by way of example only, wherein:

BRIEF DESCRIPTION OF THE DRAWINGS

FIG. 5 is a partial perspective view of the motor and the associated extension attachment of the chain saw;

FIG. 6 is a partial vertical sectional view of the motor and the associated extension attachment of the chain saw disclosing the drive chain engaged to the motor;

FIG. 7 is a partial side elevational view of the front of the extension attachment having the saw blade connected thereto;

FIG. 8 is a vertical sectional view taken in direction of the arrows and along the plane of line 8—8 in FIG. 6;

FIG. 9 is a side elevational view of one of the two receiver members;

FIG. 10 is an end elevational view of the receiver member in FIG. 9;

FIG. 11 is a top plan view of the receiver in FIG. 9;

FIG. 12 is a perspective view of the receiver member in FIG. 12.

FIG. 13 is a partial vertical sectional view and partial side elevational view of the front of the extension attachment including a receiver member and the saw blade connected to a receiver member;

FIG. 24 is a partial side elevational view of the saw blade;

FIG. 25 is a partial top plan view of the saw blade in FIG. 24;

FIG. 26 is a front elevational view taken in direction of the arrows and along the plane of line 26—26 in FIG. 24;

FIG. 27 is a partial side elevational view of the receiver in FIG. 9 engaged to a pair of tubes and an oil conduit line;

FIG. 28 is a vertical sectional view taken in direction of the arrows and along the plane of line 28—28 in FIG. 27;

FIG. 29 is a partial side elevational view of the motor for the chain saw; and

FIG. 30 is a vertical sectional view taken in direction of the arrows and along the plane of line 30—30 in FIG. 29.

DETAILED DESCRIPTION OF THE INVENTION

Figure 1:
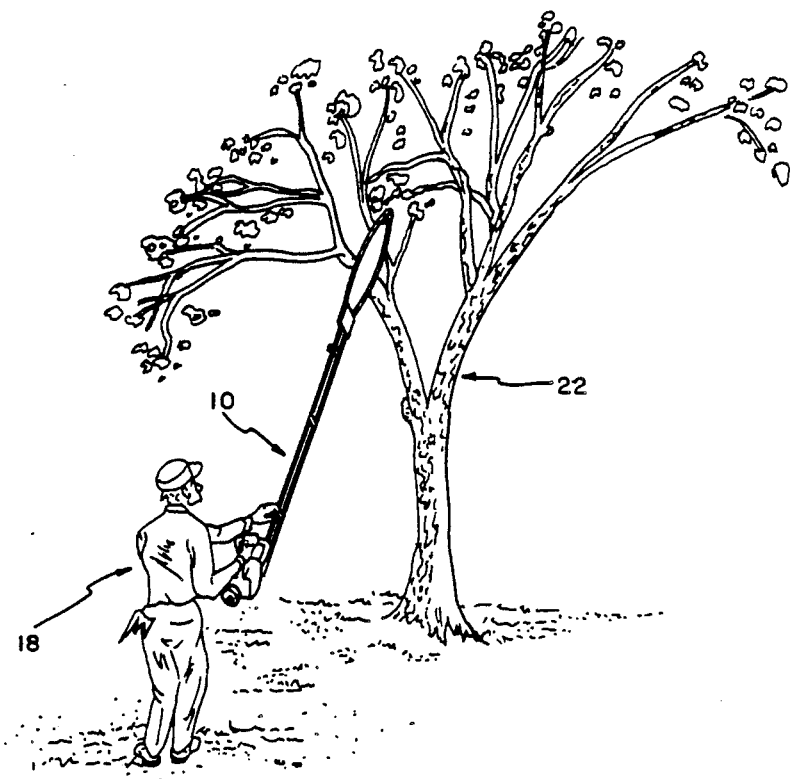
FIG. 1 is a perspective view of the chain saw being employed to cut an elevated branch in a tree.
Figure 2:
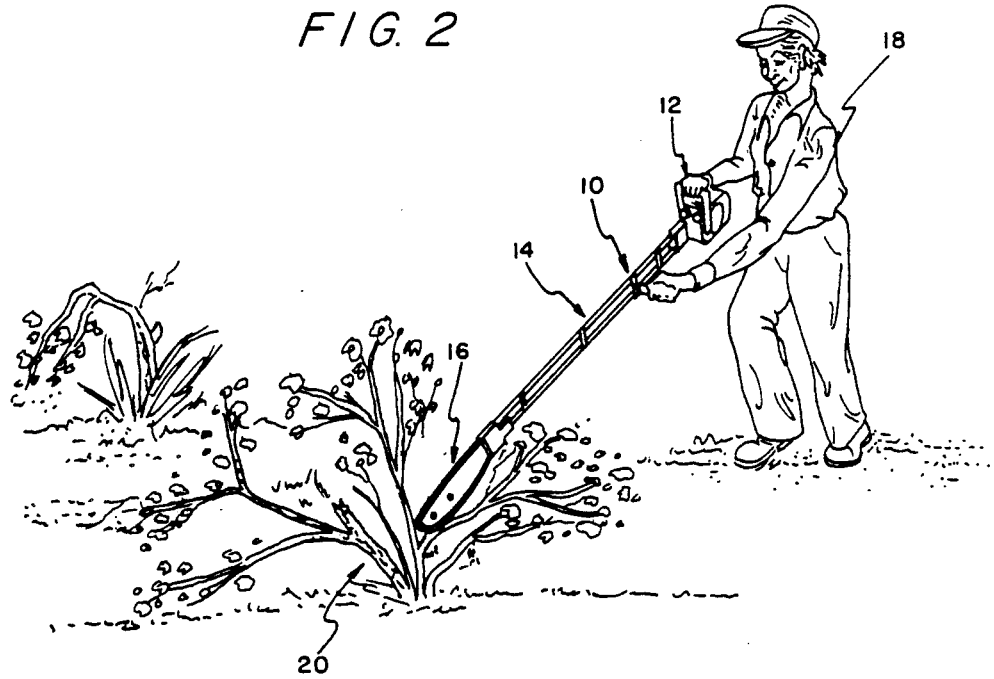
FIG. 2 is a perspective view of the chain saw being employed to cut and trim a bush at a lower position.

Referring in detail now to the drawings wherein similar parts of the invention are identified by like reference numerals, there is seen a chain saw, generally illustrated as 10, having a drive motor, generally illustrated as 12; a drive transmitting extension structure, generally illustrated as 14, removably secured to the extension structure 14; and a cutting head, generally illustrated as 16, also removably secured to the extension structure 14. As best illustrated in FIGS. 1 and 2, the chain saw 10 is held by an operator 18 to cut and/or trim foliage and/or twigs off of bushes 20 which are situated at a lower position with respect to the operator's head and generally in close proximity to the ground, or to cut and/or trim branches off a tree 22 situated at a higher position with respect to the operator's head. The chain saw 10 of this invention including it's associated extension structure 14 has numerous other uses which would be readily apparent to those artisans possessing ordinary skill in the art.

The drive motor 12 has an electrical or mechanical motor (not shown in the drawings) enclosed in a housing 26. Handles 30—30 are conveniently connected to the housing 26 so that the operator 18 may grasp and hold the chain saw 10.

Also enclosed within the housing 26 is an oil reservoir 30 (See FIG. 29) which is provided with oil through an oil inlet available after removing an oil inlet cap 32 (See FIG. 5). The housing has a longitudinal recess 31 which may be of any suitable depth, say 1/32 inch to ¼ inch in depth.

The recess 31 has an aperture 33 (See FIG. 29) wherethrough oil is introduced in order to be further passed to the cutting head 16 as will be explained in more detail hereafter. Oil from the oil reservoir 30 is transferred through the aperture 33 and into the recess 31 by a pump (not shown) which is driven off a motor shaft (not shown) that is coupled to the motor. An emitter (not shown) is also provided to control the flow of oil from the oil reservoir 30 through the aperture 33. The motor (not shown) is coupled to a sprocket 34 for rotating the same, and is provided with fuel (assuming that the motor is a mechanical motor) through a fuel inlet 36 available after removing a fuel inlet cap 36. The housing 26 is also provided with a bolt 40 which is employed to connect the extension structure 14 to the drive motor 12 (more particularly to the housing 26) through the use of a nut 42 threadably engaging the bolt 40 (See FIGS. 5 and 29). The housing 26 is further also provided with a recess 44 which may be of any suitable depth, say ⅛ inch to ⅜ inch, such that a bolt 46 may be rotatably lodged to freely rotate therein.

The bolt 46 is provided with a head 48 which is accessible to the operator 18 such that any suitable implement (e.g. a screwdriver) can engage the head 48 to turn same including the bolt 46. A lug member 50 is threadably engaged to the bolt 46 such that when the bolt 46 turns, the lug member 50 can travel longitudinally along the bolt 46. Obviously, when the bolt 46 is turned counterclockwise, the lug member 50 travels in a longitudinal direction; and when the bolt 46 is turned clockwise, the lug member 50 travels in the other longitudinal direction. The lug member 50 has a protruding port 52 which engages the extension member 14 to fine tune and adjust the coupling of the extension member 14 to the drive motor 12, all of which will be explained in more detail below. A removable lid 56 is removably connected to the housing 26 to shield and enclose the bolt 46-lug member 50 and the sprocket 34 from the operator 18.

The drive transmitting extension structure 14 comprises a first receiver member, generally illustrated as 60 (See FIGS. 9 and 12), a second receiver member, generally illustrated as 62 (See FIG. 15), and an upper tube 64 and a lower tube 66 both of which removably connect to the first and second receiver members 60 and 62.

Figure 14:
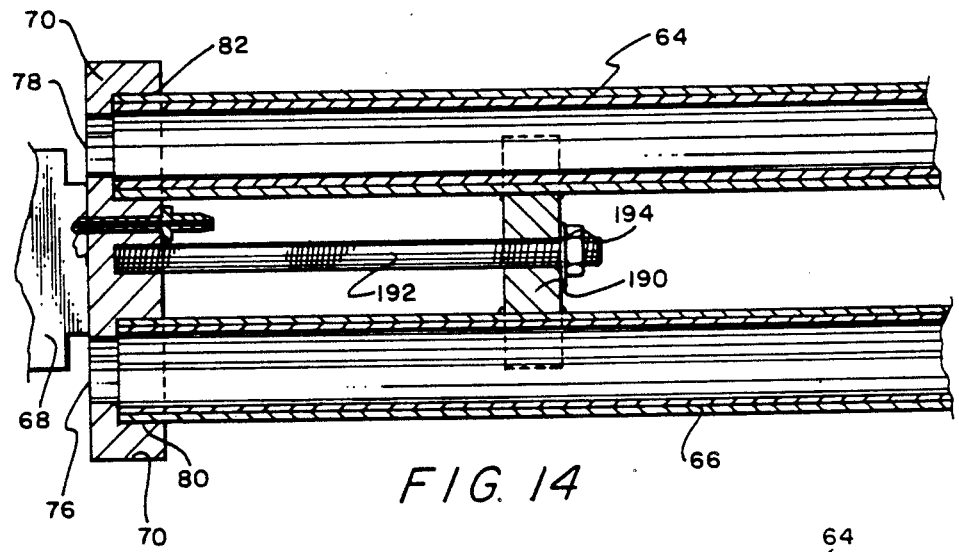
FIG. 14 is a vertical sectional view taken in direction of the arrows and along the plane of line 14—14 in FIG. 5.

The first receiver member 60 has a body 68 and a shoulder to integrally bound to the body 68. The body 68 has a longitudinal slot 72 wherethrough the bolt 40 of the drive motor 12 passes for removably securing the extension structure 14, more specifically to the first receiver member 60. The first receiver member 60 also has a recess 74 wherein the protruding part 52 of the lug member 50 lodges for fine tuning and adjusting the distance of the first receiver member 60 against the drive motor 12, more specifically against the housing 26 of the same. When the bolt 46 is rotated, the lug member 50 moves which in turn causes the first receiver member 60 (and the entire extension structure 14) to move through and by the protruding part 52 lodging in the recess 74. The shoulder 70 comprises an upper opening 78, a lower opening 76, an upper recess 82 that has a larger diameter than the upper opening 78 and communicates with same, and a lower recess 80 that has a larger diameter than the lower opening 76 and communicates with the same. The shoulder 70 also comprises a threaded bore 84 and a smooth bore 86 which communicates with an oil bore 88 which extends through the body and terminates in a pair of oil apertures 90—90 that open into the atmosphere. Apertures 90—90 align and register with longitudinal recess 31 in the housing 26 of the drive motor 12 such that oil passing through the aperture 33 and into the longitudinal recess 31 may continue into the apertures 90—90 for passage through the oil bore 88 and the smooth bore 86 and eventually to the cutting head 16 as will be explained in more detail below. In assembly, the body 68 of the first receiver member 60 is flushed firmly against the housing 26 such that there is no oil seepage out of the longitudinal recess 31 between the body 68 and the housing 26. As best illustrated in FIGS. 5 and 14, the upper tube 64 is slidably disposed in the upper recess 82 such that the inside of the upper tube 64 communicates with upper opening 78; and similarly, the lower tube 66 is slidably disposed in the lower recess 80 such that the insides of the lower tube 66 communicates with the lower opening 76.

The second receiver member 62 has a body 94 and a shoulder 96 integrally bound to the body 94. The body 94 has a longitudinal recess 98 and a bore 100 extending through the body 94 from an end thereof and terminating in the longitudinal recess 98. A screw member 102 has a head 104 and extends rotatably through the bore 100 and into the longitudinal recess 98 (See FIG. 15). A lug member 106, identical to the lug member 50 in FIG. 30, is threadably engaged to the screw member 102 in the longitudinal recess 98 such that when the screw member 102 is turned by the operator 18, the lug member 106 travels longitudinally along the screw member 102 within the longitudinal recess 98. The head 104 of the screw member 102 is accessible to the operator 18 to facilitate the turning of the screw member 102 with any suitable implement, such as a screwdriver. Obviously, as was seen for the bolt 46 - lug member 50 combination of FIGS. 29-30, when the screw member 102 is turned counterclockwise, the lug member 106 travels in one longitudinal direction, and when the screw member 102 is turned clockwise, the lug member 106 travels in the other longitudinal direction. As was seen for lug member 50, the lug member 106 has a protruding part 108 which engages a saw blade (to be identified below) of the cutting head 16 to fine tune and adjust the position of the cutting head 16 against the second receiver member 62 such that any slack of an endless saw chain (to be identified below) of the cutting head 16 can be taken-up. The body 94 also has another longitudinal recess 110 which possesses an aperture 112 that communicates with a bore 114 that extends from the apertures 112 within the body 94. A pair of openings 116—116 is disposed in the body 94 for receiving slidably a pair of bolts 118—118 for removably connecting a saw blade (to be identified below) of the cutting head 16 to the body 94.

Figure 15:
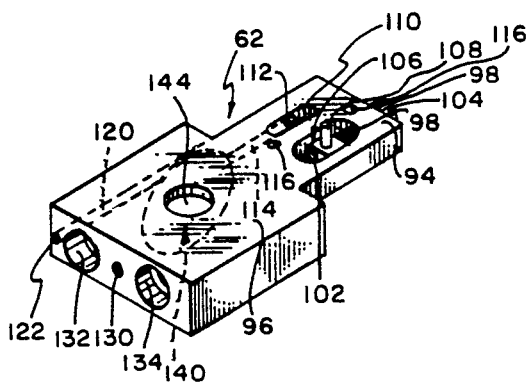
FIG. 15 is a perspective view of the other of the two receiver members.
Figure 18:
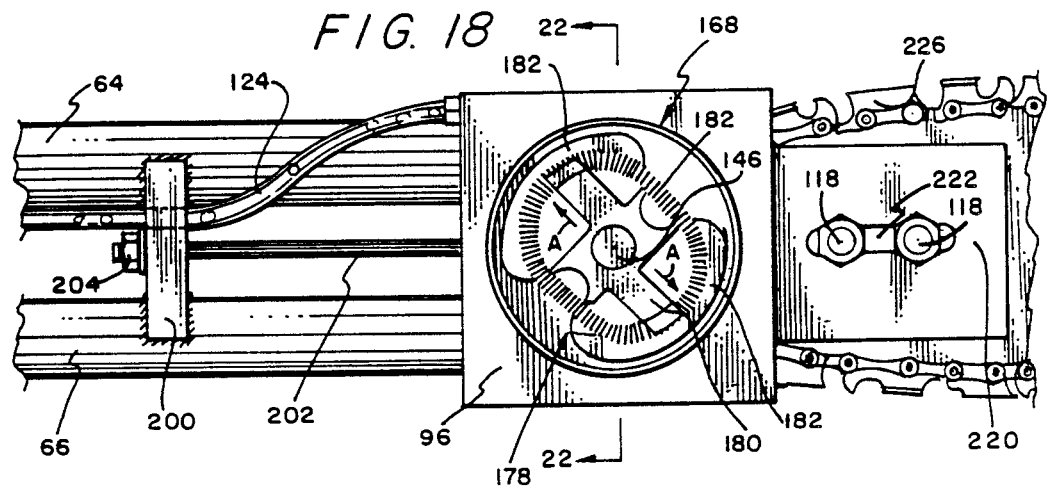
FIG. 18 is a partial side elevational view of the front of the extension attachment including a receiver member, the centrifugal clutch, and the saw blade connected to the receiver member.
Figure 19:
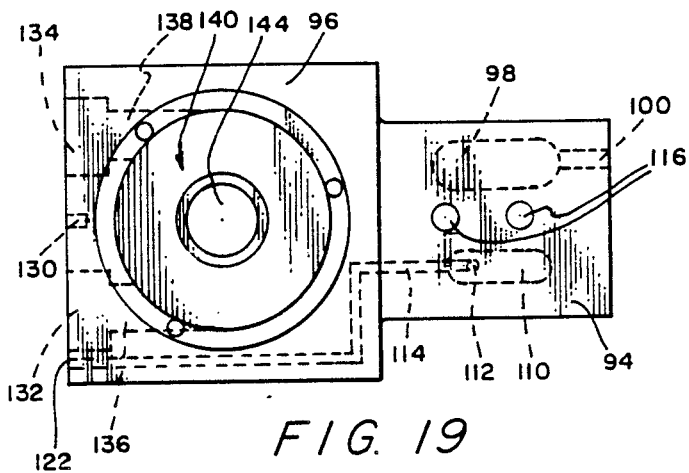
FIG. 19 is a side elevational view of the receiver member FIG. 15 without the screw member and lug member threadably engaged to the screw member.
Figure 20:
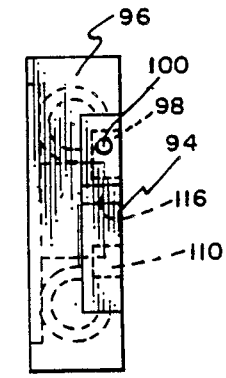
FIG. 20 is an end elevational view of the receiver member in FIG. 19.
Figures 21, 22:
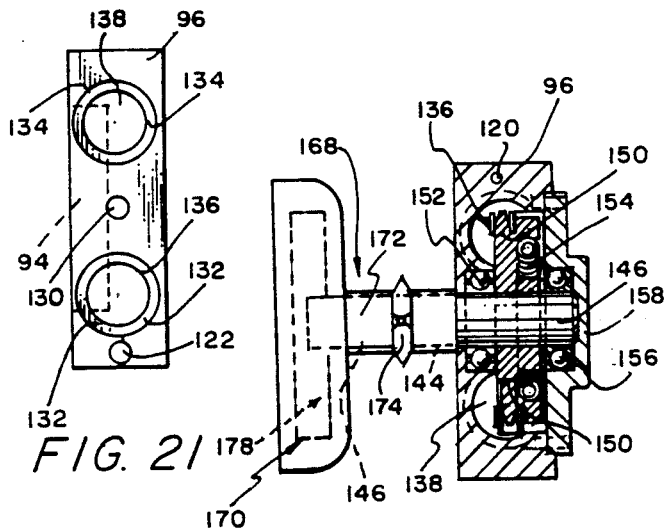
FIG. 21 is another end elevational view of the receiver member in FIG. 19.
FIG. 22 is a vertical sectional view taken in direction of the arrows and along the plane of line 22—22 in FIG. 18.
Figure 23:
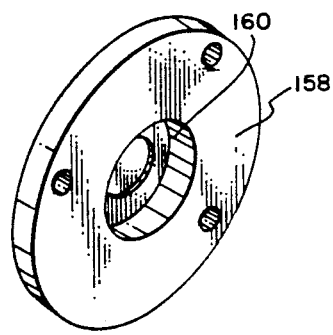
FIG. 23 is a perspective view of the cover plate for the receiver member in FIGS. 18-22.

The shoulder 96 of the second receiver member 62 has an oil bore 120 extending through its structure as best illustrated in FIG. 15. Oil bore 120 is in direct communication with bore 114 and terminates in opening 122 at an end thereof. An oil conduit 124 extends from opening 122 to the shoulder 70 for communication with the smooth bore 86 of the shoulder 70 such that oil passing through the oil bore 88 of the body 68 and through the smooth bore 86 continues through the oil conduit 124, through oil bore 120, and through bore 114 for discharge through aperture 112 and into longitudinal recess 110 where it comes in contact with a saw blade (to be identified below) for lubricating the same along with a saw chain (also to be identified below). The shoulder 96 also has a threaded bore 130 and a pair of generally cylindrical recesses 132 and 134 which respectively communicate concentrically with a pair of generally cylindrical openings 136 and 138 that terminate in a generally bowl-shaped recess, generally illustrated as 140. Upper tube 64 and lower tube 66 are respectively slidably disposed in recesses 132 and 134 such that the insides of the upper and lower tubes 64 and 66 respectively communicate with the openings 136 and 138 and with the bowl-shaped recess 140. The shoulder 96 further includes a shaft opening 144 that terminates in the bowl-shaped recess 140. A shaft 146 extends through the shaft opening 144 into the recess 140 and protrudes and/or extends away from the shoulder 96 as best illustrated in FIG. 22. A sprocket 150 is keyed and bound to the shaft 146 in order to rotate therewith. Bearings 152 and 154 are conveniently disposed around the shaft 146 within recess 140 such that the sprocket 150 is between the bearings 152 and 154 as best shown in FIG. 22. An outer bearing 156 is disposed at the end of the shaft 146 and contiguously to bearing 154. A bearing plate 158 with an outer bearing recess 160 (See FIG. 23) is positioned over the recess 140 and connected to the shoulder 96 such that the outer bearing 156 resides in outer bearing recess 160 and the same along with bearings 152 and 154 and sprocket 150 are encapsulated within the recess 140. An endless chain 162 is entrained to the sprocket 150 for driving the same off of the power from the drive motor 12. More specifically, endless chain 162 is also entrained to sprocket 34 and passes through upper opening 78 including the upper recess 82, through the upper tube 64, the recess 132, opening 136, around sprocket 150, and through opening 138, the recess 134, the lower tube 66, the lower recess 80, the lower opening 76 and back to sprocket 34. As the motor (not shown) of the drive motor 12 rotates sprocket 34, the endless chain 162 transfers the rotary motion or power to the sprocket 150. A centrifugal clutch housing, generally illustrated as 168 (See FIG. 22), is rotatably mounted to shaft 146. More particularly, the centrifugal clutch housing 168 has a bowl-shaped wall 170 and a generally cylindrical sleeve 172 bound thereto. Sleeve 172 is rotatably secured around an end of the shaft 146. A sprocket 174 is attached to the outside of the sleeve 172 such as to rotate therewith. As best shown in FIG. 18, attached to the end of the shaft 146 and disposed in the centrifugal clutch housing 168 is a centrifugal clutch, generally illustrated as 178. Centrifugal clutch 178 may be any centrifugal clutch, but in a preferred embodiment of the invention, centrifugal clutch 178 comprises a clutch support member 180 that is connected to the end of the shaft 146 (See FIG. 18) such as to rotate therewith. Slidably disposed on the support member 180 such as to be able to slide in direction of arrows A-A in FIG. 18 is a pair of disc or shoes 182—182 which are biasingly urged toward each other and in direction of shaft 146 is a circular spring 184. The circular spring 184 is engaged to each of the shoes 182—182 and as the shaft 146 rotates at a higher r.p.m., the centrifugal force resulting from the higher revolutions causes the shoes 182—182 to slide outwardly in direction of the arrows A-A to eventually engage the centrifugal clutch housing 168, more particularly the wall 170 of the clutch housing 168, and cause the same to turn. When the clutch housing 168 turns, sleeve 172 turns which results in sprocket 174 turning. The sprocket 174 is entrained to a saw chain (to be identified below) such that as it turns, the to be identified saw chain moves over and around a periphery of a saw blade (also to be identified below) of the cutting head 16 in order to cut and trim as desired. At lower r.p.m., the shoes 182—182 disengage from the wall 170 and the clutch housing 168.

Figures 3, 4:
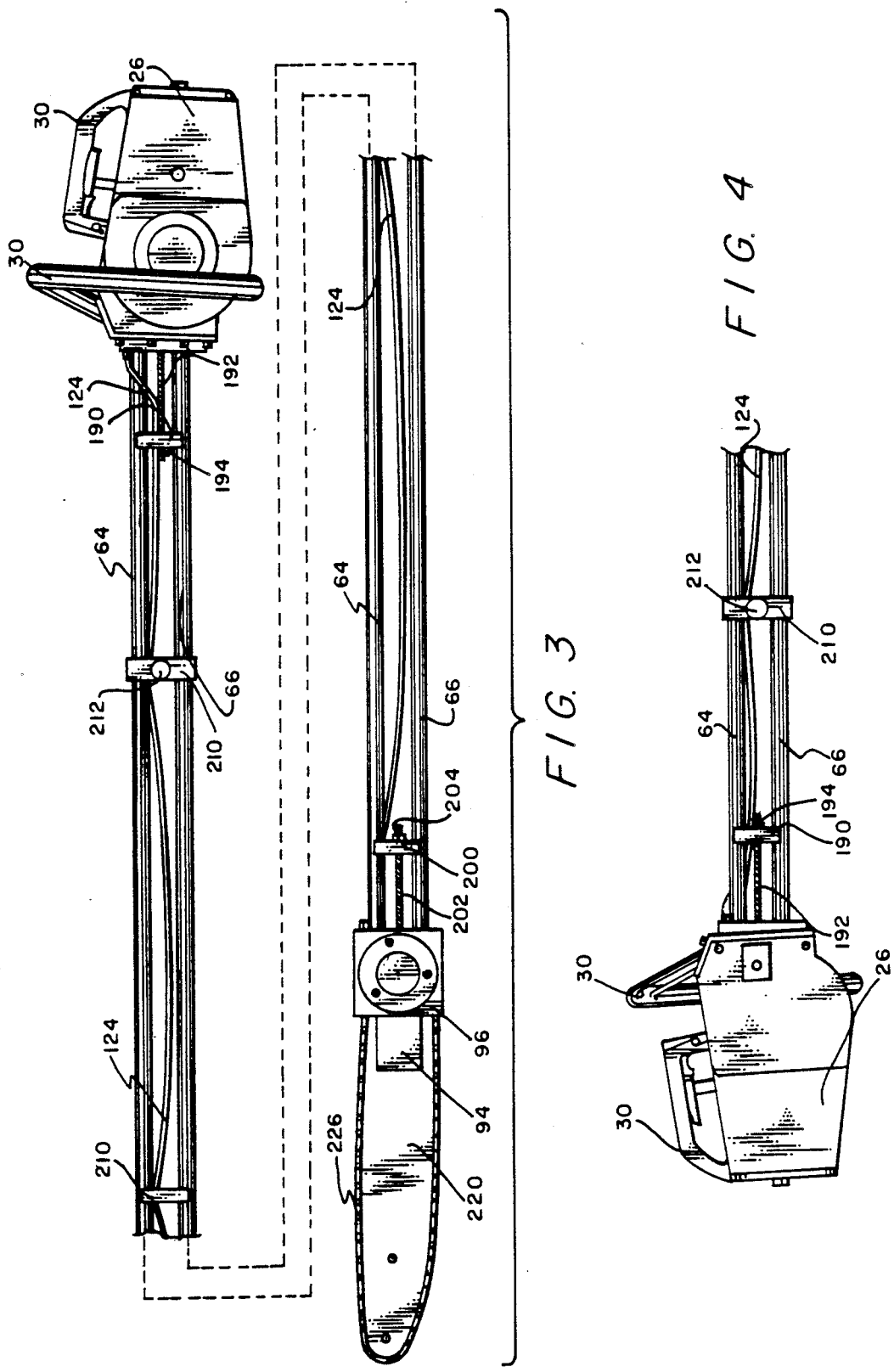
FIG. 3 is a segmented side elevational view of the chain saw including the extension attachment.
FIG. 4 is a partial side elevational view of another side of the chain saw in FIG. 3.
Figure 16:
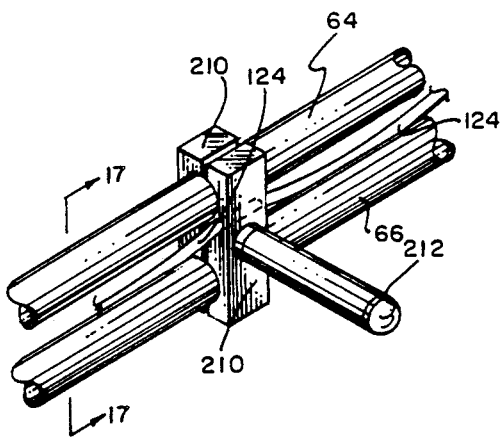
FIG. 16 is a partial perspective view of the pair of tubes having secured thereto a spacer member with a handle connected thereto.
Figure 17:
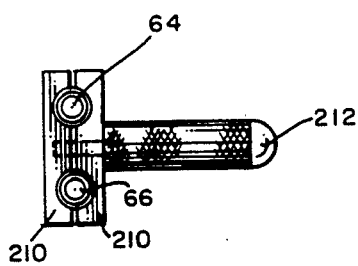
FIG. 17 is a vertical sectional view taken in direction of the arrows and along the plane of line 17—17 in FIG. 16.

In proximity to the first receiver member 60, a spacer member 190 is connected to the upper tube 64 and to the lower tube 66. A bolt member 192 threadably passes into the threaded bore 84 of the shoulder 70 and extends through the spacer member 190 as best illustrated in FIG. 5. A nut 194 threadably engages an exposed end of the bolt member 192 and when flushed against the spacer member 190, the bolt member 192-nut 194 functions (along with the spacer member 190) as a means for holding the upper tube 64 and the lower tube 66 in the upper recess 82 and lower recess 80 respectively. Similarly, in proximity to the second receiver member 62, a spacer member 200 is attached to the upper tube 64 and to the lower tube 66. A bolt member 202 threadably passes into the threaded bore 130 of the shoulder 96. The bolt member 202 also extends through the spacer member 200 (See FIG. 3). A nut 204 threadably engages an exposed end of the bolt member 202. When the nut 204 is threadably tighten to completely flush against the spacer member 200, the combination of the spacer member 200 and the nut 204-bolt member 202 provides a means for holding the upper tube 64 and the lower tube 66 in the recess 132 and recess 134, respectively. Also connected to the upper and lower tubes 64 and 66 respectively is one or more pair of support members 210—210 (See FIG. 16). A handle 212 may be conveniently connected to one or more support members 210—210. As best shown in FIGS. 3, 4, and 16, the oil conduit 124 passes between the support members 210—210 as well as through the spacer members 190 and 200.

The cutting head 16 is a conventional type cutting head comprising a saw blade 220. As best shown in FIGS. 24–27, the saw blade 220 has a longitudinal slot 222 wherethrough bolts 118—118 pass after passing through the openings 116—116 of the body 94 of the second receiver member 62 for securing the saw blade 220, or more broadly the cutting head 16, to the extension structure 14, more particularly to the second receiver 62 of the extension structure 14. The saw blade 220 also has a channel 224 along the periphery thereof where a saw chain 226 passably lodges such as to be movable within the channel 224 and to also protrude slightly above the saw blade 220 to provide a cutting portion. The saw chain 226 is further entrained to sprocket 174 which, as previously indicated, is bound to sleeve 172. As the sprocket 174 turns, the saw chain 226 turns causing the saw chain 226 to move through the channel 224 and over and around the periphery of the saw blade 220. The saw blade also has a pair of apertures 230-230 extending transversely through its entire structure such that part of each apertures 230 forms a recess 232 (See FIG. 25) in the bottom of the channel 224. When the saw blade 220 is secured against the body 94 of the second receiver member 62, one of the apertures 230 receives the protruding part 108 of the lug member 106 while the other aperture 230 is aligned over and registers with the longitudinal recess 110 such that oil passing through aperture 112 and being emitted into the longitudinal recess 110 may continue through the other aperture 230 and into the recess 232 where is comes in contact with the bottom of the saw chain 226 to lubricate the same. By the protruding part 108 engaging the saw blade 220 by lodging in one of the apertures 230, any slack or over-tightness in the saw chain 226 may be taken up or let out by turning the head 104 of the screw member 102. When the head 104 of the screw member 102 is turned in a predetermined direction to turn the latter, the lug member 106 travels longitudinally along the screw member 102 also in a predetermined direction. Such travel by the lug member 106, causes the protruding part 108 to move the saw blade 220 gradually ever so slightly which in turn, either extends the distal end of the saw blade 220 further away from the body 94 to thereby take-up slack and tighten the saw chain 226 or moves the distal end of the saw blade 220 closer to the body 94 to thereby loosen the saw chain 226.

With continuing reference to the drawings for operation of the present invention, the chain saw 10 with the extension structure 14 is assembled as indicated above. The drive motor 12 is energized. This commences rotary motion in the sprocket 34 and the dispensing of oil from the oil reservoir 30. As the sprocket 34 rotates, the entrained endless chain 162 moves through opening 78, through the upper tube 64, through the opening 136 and into the recess 140, around the sprocket 150 in an entraining fashion, and subsequently through opening 138, through the lower tube 66, and through the opening 76. The rotary movement of the endless chain 162 causes the sprocket 150, the keyed shaft 146, and the centrifugal clutch 178 to move. At lower r.p.m. the centrifugal clutch 178 does not engage the wall 170 of the clutch housing 168. As the drive motor 12 is accelerated to begin cutting with the saw chain 226, the r.p.m. of the sprocket 34 and 150 increases which cause the r.p.m. of the keyed shaft 146 and the centrifugal clutch 178 to increase. At higher r.p.m., the resulting increase in centrifugal force causes the shoes 182—182 to slide outwardly in direction of the arrows A-A in FIG. 18 to engage the wall 170 of the clutch housing 168. Such engagement transfers rotary power to the clutch housing 168 at the identical r.p.m. of the shaft 146. Rotary motion of the clutch housing 168 causes the sleeve 172 and the sprocket 174 to revolve. As the sprocket 174 revolves, the entrained saw chain 226 commences slidably movement through the channel 224 and around the periphery of the saw blade 220 to provide a cutter in the moving saw chain 226. As the drive motor 12 is accelerated, more oil is emitted through aperture 33 and into the longitudinal recess 31 of the housing 26. As the flow rate of the oil increases, oil passes from the longitudinal recess 31, through apertures 90-90 into the oil bore 88, through smooth bore 86 of the shoulder 70 and into the oil conduit 124 where the oil is conducted into oil bore 120 of shoulder 96, through bore 114 and aperture 112 and into the longitudinal recess 110. From the longitudinal recess 110 the flowing oil passes through one of the apertures 230 and into recess 232 where the bottom of the saw chain 220 comes in contact with the oil to lubricate the cutting head 16 in general, particularly the channel 224 wherein the saw chain 220 moves. After the cutting operation has been terminated, the drive motor 12 is decelerated in a lower r.p.m. to curtail the flow of oil and to disengage the centrifugal clutch 178 from the wall 170 of the clutch housing 168, causing sprocket 174 to stop rotating and to further cause the saw chain 226 to stop moving. The extension structure 14 provides a structure for extending the reach of the cutting head 16.

Thus, by the practice of this invention there is provided a chain saw 10 including an extension structure 14 which facilitates the pruning of trees, cutting down tall weeds from under trees and in fence rows, and cutting down ornamental grass and dead flowers and flower plants in the spring. The chain saw 10 including the extension structure of this invention also facilitates sawing wood since the operator does not have to stoop over. The extension structure 14 can be attached to any drive motor 12 or any cutting head 16 by using proper adapters for each brand and model of drive motor 12 and cutting head 16.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A drive transmitting extension structure for connecting a cutting head of a chain saw with a spaced apart motor comprising a first receiver member for being removably connected to a drive motor, said first receiver member having a first body and a first shoulder bound to the first body, said first body having a structure defining a first oil body bore wherethrough oil passes from a drive motor and said first shoulder having a structure defining a first upper opening, a first upper recess communicating with the first upper opening and a first lower opening, a first lower recess communicating with the first lower opening and a first oil shoulder bore communicating with the first oil body bore for receiving oil from the first oil body bore and passing the same into an oil conduit line; a second receiver member for being removably secured to a cutting head, said second receiver member having a second body and a second shoulder bound to the second body, said second shoulder having a structure defining a second upper opening, a second upper recess communicating with the second upper opening and a second lower opening, a second lower recess communicating with the second lower opening, and a second oil shoulder bore for receiving oil from an oil conduit line, said second body having a structure defining a second oil body bore communicating with the second oil shoulder bore for receiving oil therefrom and for passing the same into contact with a cutting head; an oil conduit line connected to said first shoulder and to said second shoulder and communicating with said first oil shoulder bore and with said second oil shoulder bore; an upper tube disposed in said first upper recess of said first shoulder and in said second upper recess of said second shoulder; and a lower tube disposed in said first lower recess of said first shoulder and in said second lower recess of said second shoulder.

2. The drive transmitting extension structure of claim 1 additionally comprising a first spacer member connected to said upper tube and said lower tube; and a first bolt means adjustably secured to said first spacer member and to said first shoulder for holding the upper tube and the lower tube in said first upper recess and said first lower recess respectively.

3. The drive transmitting extension structure of claim 2 additionally comprising a second spacer member connected to said upper tube and said lower tube; and a second bolt means adjustably secured to said second spacer member and to said second shoulder for holding the upper tube and the lower tube in said second upper recess and said second lower recess respectively.

4. The drive transmitting extension structure of claim 3 wherein said first body additionally having a structure defining a first body recess and a first longitudinal opening.

5. The drive transmitting extension structure of claim 4 wherein second body additionally comprises a second longitudinal opening and a second body longitudinal bore extending through its second body and terminating in the second longitudinal opening.

6. The drive transmitting extension structure of claim 5 additionally comprising a screw member rotatably passing through said second body longitudinal bore and into said second longitudinal opening; and a lug member threadably engaged to said screw member in said second body longitudinal bore.

7. The drive transmitting extension structure of claim 6 wherein said second shoulder additionally has a structure defining a sprocket recess; and said drive transmitting extension structure additionally comprises a shaft member rotatably disposed through said second shoulder and through said sprocket recess; a sprocket member keyed to said shaft member and rotatably disposed in said sprocket recess; a centrifugal clutch housing means rotatably disposed around said shaft member for rotating when engaged by a centrifugal clutch member; and a centrifugal clutch member engaged to an end of said shaft member to rotate therewith such as to be able to engage the centrifugal clutch housing means and cause the same to rotate at higher revolutions per minute.

8. The drive transmitting extension structure of claim 7 additionally comprising a chain saw sprocket member bound to said centrifugal clutch housing means to rotate therewith and to engage a chain saw.

9. A chain saw comprising a cutting head; a drive motor; and a drive transmitting extension structure for connecting said cutting head to said drive motor; said drive transmitting extension structure comprising a first receiver member for being removably connected to said drive motor, said first receiver member having a first body and a first shoulder bound to the first body, said first body having a structure defining a first oil body bore wherethrough oil passes from a drive motor and said first shoulder having a structure defining a first upper opening, a first upper recess communicating with the first upper opening and a first lower opening, a first lower recess communicating with the first lower opening and a first oil shoulder bore communicating with the first oil body bore for receiving oil from the first oil body bore and passing the same into an oil conduit line;

a second receiver member for being removably secured to said cutting head, said second receiver member having a second body and a second shoulder bound to the second body, said second shoulder having a structure defining a second upper opening, a second upper recess communicating with the second upper opening and a second lower opening, a second lower recess communicating with the second lower opening and a second oil shoulder bore for receiving oil from an oil conduit line, said second body having a structure defining a second oil body bore communicating with the second oil shoulder bore for receiving oil therefrom and for passing the same into contact with a cutting head; an oil conduit line connected to said first shoulder and to said second shoulder and communicating with said first oil shoulder bore and with said second oil shoulder bore; an upper tube disposed in said first upper recess of said first shoulder and in said second upper recess of said second shoulder; and a lower tube disposed in said first lower recess of said first shoulder and in said second lower recess of said second shoulder; and an endless chain engaged to the drive motor and passing through said first upper opening, said upper tube and said second upper opening, and through said first lower opening, said lower tube and through said second lower opening.

10. The chain saw of claim 9 additionally comprising a first spacer member connected to said upper tube and said lower tube; and a first bolt means adjustably secured to said first spacer member and to said first shoulder for holding the upper tube and the lower tube in said first upper recess and said first lower recess respectively.

11. The chain saw of claim 10 additionally comprising a second spacer member connected to said upper tube and said lower tube; and a second bolt means adjustably secured to said second spacer member and to said second shoulder for holding the upper tube and the lower tube in said second upper recess and said second lower recess respectively.

12. The chain saw of claim 11 wherein said first body additionally having a structure defining a first body recess and a first longitudinal opening.

13. The chain saw of claim 12 wherein second body additionally comprises a second longitudinal opening and a second body longitudinal bore extending through its second body and terminating in the second longitudinal opening.

14. The chain saw of claim 13 additionally comprising a screw member rotatably passing through said second body longitudinal bore and into said second longitudinal opening; and a lug member threadably engaged to said screw member in said second body longitudinal bore.

15. The chain saw of claim 14 wherein said second shoulder additionally has a structure defining a sprocket recess; and said drive transmitting extension structure additionally comprises a shaft member rotatably disposed through said second shoulder and through said sprocket recess; a sprocket member keyed to said shaft member and rotatably disposed in said sprocket recess; a centrifugal clutch housing means rotatably disposed around said shaft member for rotating when engaged by a centrifugal clutch member; and a centrifugal clutch member engaged to an end of said shaft member to rotate therewith such as to be able to engage the centrifugal clutch housing means and cause the same to rotate at higher revolutions per minute.

16. The chain saw of claim 15 additionally comprising a cutting chain sprocket member bound to said centrifugal clutch housing means to rotate therewith, said endless chain engaged to said sprocket member; and said cutting head comprises a cutting chain member engaged to said cutting chain sprocket member.

* * * * *